H. C. CALHOUN.
VEHICLE WHEEL.
APPLICATION FILED MAR. 10, 1921.
1,407,252.
Patented Feb. 21, 1922.
3 SHEETS—SHEET 3.
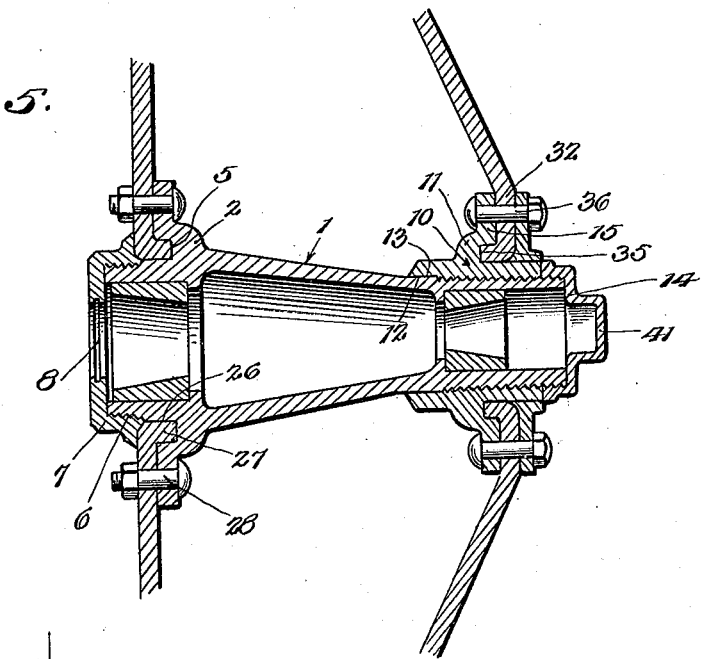
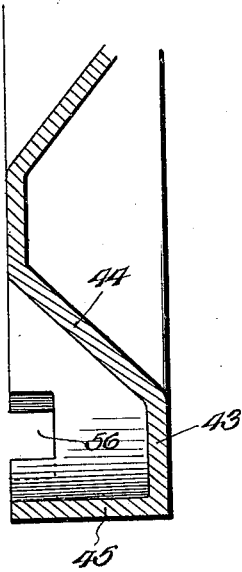
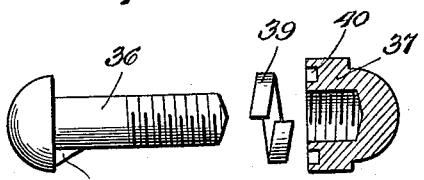
Inventor
H. C. Calhoun.
By Lacey & Lacey, Attorney

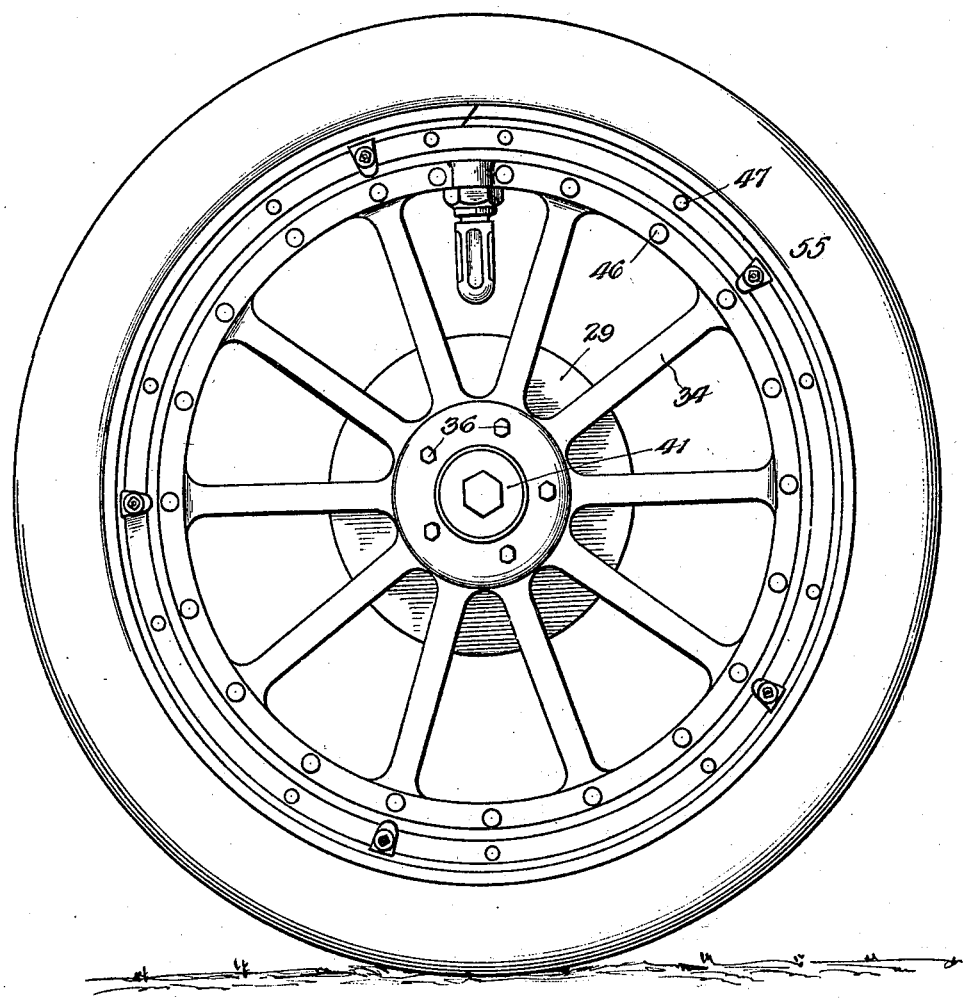

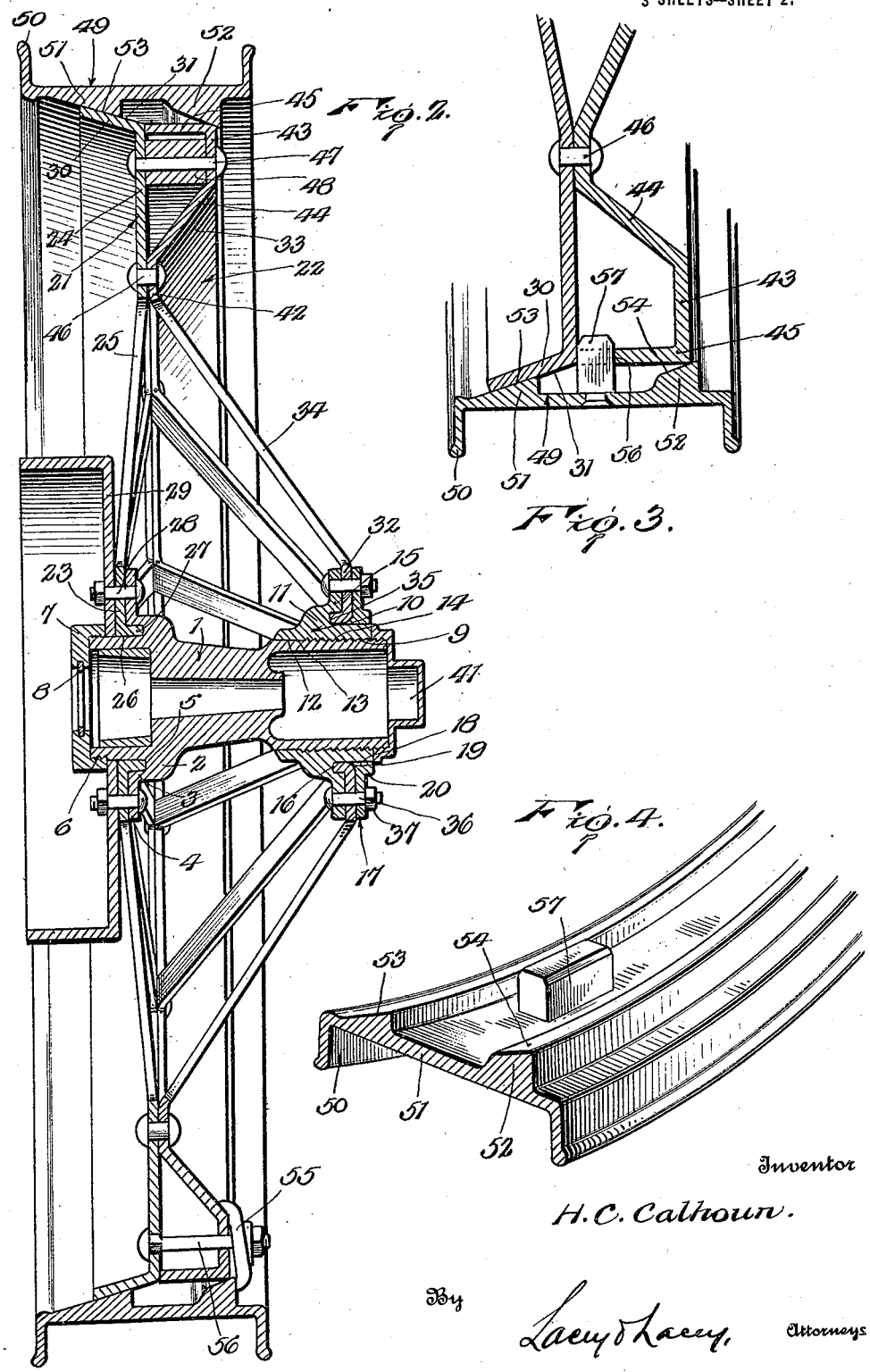

UNITED STATES PATENT OFFICE.

HENRY C. CALHOUN, OF DETROIT, MICHIGAN.

VEHICLE WHEEL.

1,407,252.

Specification of Letters Patent. Patented Feb. 21, 1922.

Application filed March 10, 1921. Serial No. 451,400.

*To all whom it may concern:*

Be it known that I, HENRY C. CALHOUN, a citizen of the United States, residing at Detroit, in the county of Wayne and State of Michigan, have invented certain new and useful Improvements in Vehicle Wheels, of which the following is a specification.

This invention relates to improvements in vehicle wheels and is designed more especially as an improvement on the wheel shown in my Patent No. 1227381 issued May 22, 1917.

The invention generally has as its object to improve certain parts of the patented structure to render the same more durable, stronger, and capable of being more readily manufactured.

In the accompanying drawings:

Figure 1 is a side elevation of the wheel embodying the invention;

Figure 2 is a vertical diametric sectional view through the wheel;

Figure 3 is a detail sectional view through the rim portion of the wheel illustrating the driving connection between the rim and felly;

Figure 4 is a sectional perspective view of a portion of the rim;

Figure 5 is a detail diametric sectional view through the hub portion of a wheel constructed in accordance with the invention;

Figure 6 is a sectional view in detail illustrating a portion of one of the body members of the wheel;

Figure 7 is a view partly in elevation and partly in section illustrating one of the bolt assemblies for securing the body members of the wheel to the hub.

The wheel embodying the invention comprises a hub indicated in general by the numeral 1 and which is of the form illustrated in Figure 2 where embodied in a rear wheel and of the form illustrated in Figure 5 where embodied in a front wheel. In either form the hub 1 is provided near its inner end, with a circumscribing boss 2 from which a flange 3 projects for a relatively short distance in the direction of the said end of the hub, the flange being then directed outwardly circumferentially as at 4. The portion 3 of the flange is spaced from the exterior surface of the said end portion of the hub so as to provide a circumscribing channel 5 the purpose of which will presently be made apparent, and the said portion of the hub beyond the boss and flange is exteriorly threaded, as at 6, for the application thereto of a grease retainer 7 provided with a gland 8 to surround the spindle upon which the hub is mounted. The hub near its opposite or outer end is likewise threaded as indicated by the numeral 9 and adjustably fitted thereon is an expander 10 comprising an annular body 11 having a bore 12 cylindrical and smooth for a portion of its length as indicated by the numeral 13 and interiorly threaded, as at 14, for the remainder of its length thus adapting it to be adjusted upon the hub. The body 11 is provided with a flange 15 which projects outwardly from the outer surface of the body and circumscribes the same and which at its inner side is spaced from and concentric to the outer surface of the body so as to provide a circumscribing channel 16 which in form resembles the channel 5. The portion of the body 11 of the expander which is surrounded by the flange 15 is exteriorly cylindrical and has fitted thereon a locking ring which is indicated by the numeral 17 and which is to coact with the flange 15 in a manner and for a purpose to be presently pointed out, this ring 17 having an opening 18 to receive the cylindrical end of the body 11 of the expander and being provided upon the face which is presented in the direction of the said flange 15, when the ring is properly fitted onto the expander body, with an annular lip 19 which surrounds the opening 18, the said ring 17 being likewise thickened, as at 20, surrounding this opening.

The wheel also comprises a body consisting of an inner section indicated in general by the numeral 21 and an outer section indicated in general by the numeral 22. These two sections of the body of the wheel may be stamped from sheet metal of the required gage. The inner section 21 comprises a central portion 23, a felly portion 24 concentric thereto, and spokes 25 extending between the said portions 23 and 24, the portions 23 and 24 being located in relatively offset planes and the spokes 25 extending at a slight angle between the outer and inner edges of the said portions 23 and 24 respectively. The portion 23 is provided at its inner edge and surrounding its hub-receiving opening 26, with an annular flange 27 which seats within the channel 5 in the manner clearly shown in Figures 2 and 5 of the drawings, bolts 28 being secured through the flange 4 and through the said portions 23 of the inner body member and likewise through the web of a brake drum 29 disposed against the said portion 23 of the said body member. In order to seat the rim of the wheel as will presently be explained, the body member 21 has its portion 24 provided with an outwardly obliquely directed circumscribing flange 30 providing a conical seating surface 31 at its outer side.

The body member 22 of the wheel comprises an inner annular portion 32, an outer annular felly portion 33, and spokes 34 which extend between the said portions 32 and 33 in the same manner as do the spokes 25 between the portions 23 and 24 of the inner body section. However, the spokes 34 are more obliquely disposed than the spokes 25 and consequently the portions 32 and 33 of the body sections 22 are offset in planes spaced apart a greater distance than the planes occupied by the portions 23 and 24 of the section 21. The portion 32 of the body section 22 is provided upon its inner face and surrounding its opening, with a laterally directed circumscribing flange 35 which seats within the channel 16, the said portion 32 being disposed snugly against the outwardly presented face of the flange 15, and the locking ring 17 being disposed against the opposite side of the said portion 32 and the parts being secured together by bolts 36 onto which are fitted cap nuts 37. Preferably the bolts 36 are of the form shown in Figure 7 of the drawings and are each provided with a key portion or feather 38 to engage in a similarly formed notch in the respective bolt opening of the flange 15, the cap nuts 37 being held against loosening by the provision of lock washers 39 of spiral form, which washers are received in grooves 40 formed in the binding faces of the respective nuts 37 and bear against the locking ring 17. A dust cap 41 may be removably fitted onto the threaded end 31 of the portion 21 to bear against the outer end of the body of the expander 10.

The felly portion 33 of the body section 22 includes inner and outer portions 42 and 43 occupying substantially parallel planes, and an intermediate portion 44 which extends between the portions 42 and 43 and is diagonally disposed so as to have a general conical form. The portion 43 is provided upon one face at its outer edge with a circumscribing flange 45 the edge of which contacts the adjacent face of the portion 24 of the body section 21, the portion 42 likewise contacting this face of the portion 42 and being united thereto by rivets 46 or any other suitable means. Rivets or other suitable fastening elements 47 are likewise secured through the portion 24 and the portion 43 and these rivets extend through spacing sleeves 48 which are disposed upon the rivets 47 and between the portion 44 and flange 45 with their ends bearing against and relatively spacing and bracing the portions 24 and 43. The flange 45 describes a cylindrical form and has its outer surface in effect a cylindrical extension of the conical surface 41 of the flange 30.

The rim of the wheel is indicated in general by the numeral 49 and the same is provided with the usual side flanges 50 which may be formed to adapt the rim for the application thereto of a clincher tire casing or a tire casing having straight walls, and the rim is provided upon its inner side with spaced circumferential ribs 51 and 52 having beveled seating faces 53 and 54 respectively designed to have wedging engagement with the surface 31 of the flange 30 and the outer surface of the flange 45 of the body sections 21 and 22 of the wheel, the rim being demountably held in place upon the wheel body by means of the usual lugs 55 secured by bolts 56 passed through the felly portion 24 of the body section 21 and through the portion 43 of the body section 22.

In order to establish driving connection between the rim 49 and the body of the wheel, the flange 45 is formed with one or more notches 56 opening through its free edge, and the rim 49 is formed, between its ribs 51 and 52, with a corresponding number of lugs 57 designed to engage in the notch or notches 56.

In several respects the wheel herein described and illustrated in the drawings discloses improvements over the wheel forming the subject matter of my prior patent as will now be pointed out. In the present structure the inner or central portion 32 of the body section 22 seats about a cylindrical extension of the expander 10 and not directly about the threaded portion of the hub as in the previously patented structure so that there is no possibility of this member of the wheel body causing damage to the hub threads. Furthermore, this portion of the body is more firmly and securely seated in the present instance and a more uniform and effective adjustment of the body section 22 is provided for when the member is threaded outwardly upon the hub in expanding the body structure. Also the snug engagement of the lip 19 with the portion 32 of the body section 22 at the juncture of the flange 35 of this said portion with the wall of the opening therein, is of decided advantage.

The specific formation of the felly portion of the section 22 presents advantages inasmuch as the intermediate part 33 thereof, being diagonally disposed instead of at right angles to the portions 42 and 43 as in the patented structure, adds to the strength of the body of the wheel as it constitutes an effective brace for the felly portion of the body section 22 and likewise braces the connection of this portion with the felly portion 24 of the body section 21.

Another point of advantage lies in the construction of the parts whereby driving connection is established between the wheel body and the rim, the lug or lugs 57, in this improved structure, being engaged in notches formed directly in the felly portion of the body section 22 thus obviating the necessity of providing spaced abutments riveted to this portion or a separate socket or bearing member secured in place thereon.

Having thus described the invention, what is claimed as new is:

1. In a vehicle wheel, a hub having an exterior threaded portion, an expansible wheel body comprising a section secured to the hub and a section secured to the first-mentioned section, an expanding member adjustably fitted onto the threaded portion of the hub and having an exterior cylindrical portion, and a flange circumscribing the same and spaced therefrom to provide a channel, the last-mentioned section of the body having an opening in its central portion to receive the expanding member and provided with a lateral flange surrounding the opening and seating in the said channel and about the cylindrical portion of the said expanding member, and means securing the said portion of the body section to the said flange of the expanding member.

2. In a vehicle wheel, a hub having an exterior threaded portion, an expansible wheel body comprising a section secured to the hub and a section secured to the first-mentioned section, an expanding member adjustably fitted onto the threaded portion of the hub and having an exterior cylindrical portion, and a flange circumscribing the same and spaced therefrom to provide a channel, the last-mentioned section of the body having an opening in its central portion to receive the expanding member and provided with a lateral flange surrounding the opening and seating in the said channel and about the cylindrical portion of the said expanding member, and means securing the said portion of the body section to the said flange of the expanding member, the said means comprising a retaining ring fitted onto the cylindrical portion of the expanding member and against the central portion of the body section and provided with an annular lip fitting one side of the said central portion of the said body section at the juncture of its flange therewith.

3. In a vehicle wheel, a hub, a wheel body comprising sections having intermediate portions surrounding the hub and relatively spaced, the said sections comprising felly portions, the felly portion of one section being plane, the felly portion of the other section having portions occupying relatively offset planes, and a portion extending obliquely therebetween, one of the relatively offset portions being provided with a flange resting at its edge against the felly portion of the first mentioned section, and means securing the last-mentioned relatively off-set portion and the felly portion of the first-mentioned section together.

4. In a vehicle wheel, a hub, a wheel body comprising sections having intermediate portions surrounding the hub and relatively spaced, the said sections comprising felly portions, the felly portion of one section being plane, the felly portion of the other section having portions occupying relatively offset planes, and a portion extending obliquely therebetween, one of the relatively offset portions being provided with a flange resting at its edge against the felly portion of the first-mentioned section, and means securing the last-mentioned relatively offset portion and the felly portion of the first-mentioned section together, the said means comprising securing elements passed through said portions and spacing elements disposed thereon and abutting at their ends against the opposing faces of the said portions.

In testimony whereof I affix my signature.

HENRY C. CALHOUN. [L. S.]